United States Patent
Curran et al.

(10) Patent No.: US 7,099,385 B2
(45) Date of Patent: Aug. 29, 2006

(54) COMPENSATION FOR INTERFERENCE IN DATA RECEIVERS

(75) Inventors: Philip Curran, Dublin (IE); Stephen Bates, Dublin (IE)

(73) Assignee: Massana Research Limited, Dublin (IE)

( * ) Notice: Subject to any disclaimer, the term of this patent is extended or adjusted under 35 U.S.C. 154(b) by 757 days.

(21) Appl. No.: 10/196,247

(22) Filed: Jul. 17, 2002

(65) Prior Publication Data

US 2003/0016743 A1    Jan. 23, 2003

Related U.S. Application Data

(60) Provisional application No. 60/305,862, filed on Jul. 18, 2001.

(30) Foreign Application Priority Data

Jul. 26, 2001    (IE) ................................. 2001/0716

(51) Int. Cl.
    *H03K 5/159*    (2006.01)
(52) U.S. Cl. ............... 375/229; 375/377; 375/232; 333/28 R; 333/18; 708/322; 708/323
(58) Field of Classification Search ............... 375/229, 375/232, 341, 350, 324, 377; 333/18, 28 R; 708/319, 322, 323
    See application file for complete search history.

(56) References Cited

U.S. PATENT DOCUMENTS

| 4,943,789 A | * | 7/1990 | Surie ........................... 333/18 |
| 5,163,066 A |   | 11/1992 | Cupo et al. .................... 375/14 |
| 5,210,774 A | * | 5/1993 | Abbiate et al. ............. 375/232 |
| 5,282,225 A | * | 1/1994 | Nikias et al. ................ 375/232 |
| 6,009,120 A |   | 12/1999 | Nobakht ...................... 375/229 |
| 6,400,781 B1 | * | 6/2002 | Vandendorpe et al. ...... 375/350 |
| 6,490,318 B1 | * | 12/2002 | Larsson et al. ............. 375/232 |
| 6,570,943 B1 | * | 5/2003 | Goldston et al. ........... 375/350 |
| 6,792,440 B1 | * | 9/2004 | Hatamian .................... 708/319 |
| 2003/0194027 A1 | * | 10/2003 | Coene ........................ 375/341 |
| 2005/0159128 A1 | * | 7/2005 | Collins et al. .............. 455/284 |
| 2005/0220185 A1 | * | 10/2005 | Dowling ..................... 375/232 |

FOREIGN PATENT DOCUMENTS

| WO | WO99/07077 | 2/1999 |
| WO | WO00/28691 | 5/2000 |
| WO | WO00/62470 | 10/2000 |

OTHER PUBLICATIONS http://www.ece.ucdavis.edu/~hurst/papers/Tsai,CSS04.pdf.*
Sanyo et al, ELECTRONICS LTRS. , vol. 31, No. 12, Jun. 8, 1995, pp. 1003-1004, Unrepeatered transmission of an OTDM 40 . . . .

* cited by examiner

Primary Examiner—Mohammed Ghayour
Assistant Examiner—Leila Malek
(74) Attorney, Agent, or Firm—Jacobson Holman PLLC

(57) ABSTRACT

A data communication receiver comprises an equalizer for adapting to each of a plurality of channels to open the eye for each channel in a Gigabit (1000BASE-T) transceiver. The eye is open for a first channel (A) and a transformation process applies the coefficients of that adaptation to open the eye for the other dimensions. The transformation process keeps the magnitude response constant.

19 Claims, 5 Drawing Sheets

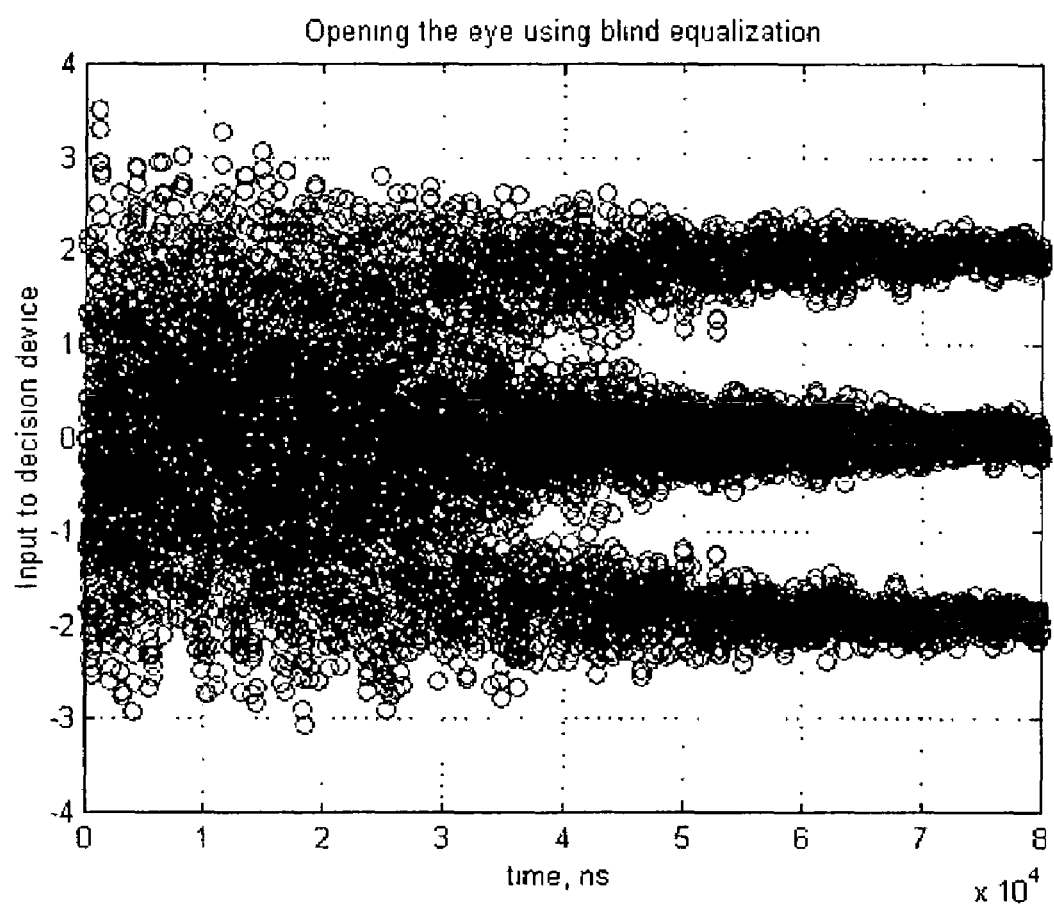
Fig. A
PRIOR ART

COMPENSATION FOR INTERFERENCE IN DATA RECEIVERS

This is a complete application claiming benefit of provisional 60/305,862 filed Jul. 18, 2001.

INTRODUCTION

1. Field of the Invention

The invention relates to compensation for interference in a data receiver of the type receiving symbols on a plurality of channels ("dimensions"). An example of such a receiver is a 1000BASE-T ("Gigabit") receiver operating according to the IEEE 802.3ab standard.

2. Prior Art Discussion

In such receivers an equalizer such as a feed forward equalizer (FFE) adapts itself at start-up to compensate for inter symbol interference (ISI) in its associated dimension. This adaptation adjusts filter coefficients automatically to optimise a pre-defined cost function. The adaptation is often referred to as "opening the eye". Several such adaptation methods are known, differing in terms of their rate of convergence and computational complexity.

A complication in the adaptation is that it must not only adapt to the characteristics of the particular cable, but also to unknown interference from other cables.

Referring to FIG. A, eye opening over a period of $8 \times 10^4$ ns using blind equalisation is illustrated. At the early stages the probability of error is very high and so convenient algorithms such as least mean squares (LMS) can not be used. Instead, a "blind" adaptation algorithm is used. Because such algorithms are often noisy and difficult to quantify mathematically, it is common practice to switch over to a LMS algorithm at an appropriate stage during eye opening.

WO 00/62470 and WO 99/07077, both describe a method for opening the eye for multiple channel receivers. The approach described involves the use of predefined training sequences or synchronisation signals at initialisation to enable synchronisation of the transmitting and receiving nodes. However, 1000BASE-T does not allow the use of training sequences.

It will thus be appreciated that the eye opening process is complex and is not guaranteed to happen within a given time period.

The invention is therefore directed towards advancing effective eye opening in a more robust manner and in less time.

SUMMARY OF THE INVENTION

According to the invention, there is provided an equalizer for a data communication receiver, the equalizer comprising means for adapting to each of a plurality of channels to open the eye for each channel, characterised in that the equalizer comprises means for opening the eye for a first channel, and for applying coefficients of said adaptation to open the eye of at least one subsequent channel.

In one embodiment, the equalizer comprises means for applying the coefficients via a transformation process.

In another embodiment, the equalizer comprises means for keeping the magnitude response substantially constant during transformation.

In a further embodiment, the equalizer comprises means for allowing a selected one of a plurality of phase delays to be applied during transformation.

In one embodiment, the equalizer comprises means for performing the transformation according to an interpolation function.

In one embodiment, the function is a linear interpolation function.

In one embodiment, the equalizer comprises means for modifying the group delay through a filter during transformation.

In another embodiment, the group delay is modified by a fraction of a symbol period.

In another embodiment, the equalizer comprises means for opening the eye of a channel transmitting IID symbols and for applying coefficients of said adaptation to open the eye of at least one non-IID channel.

According to another aspect, the invention provides a 1000BASE-T transceiver comprising an equalizer as defined above.

According to another aspect the invention provides a data communication receiver comprising an equalizer as defined above.

Detailed Description of the Invention

BRIEF DESCRIPTION OF THE DRAWINGS

The invention will be more clearly understood from the following description of some embodiments thereof, given by way of example only with reference to the accompanying drawings in which:

FIG. A is prior art;

FIG. 2 is a plot illustrating frequency response of four 1000BASE-T cables, while

DESCRIPTION OF THE EMBODIMENTS

Figure 1:
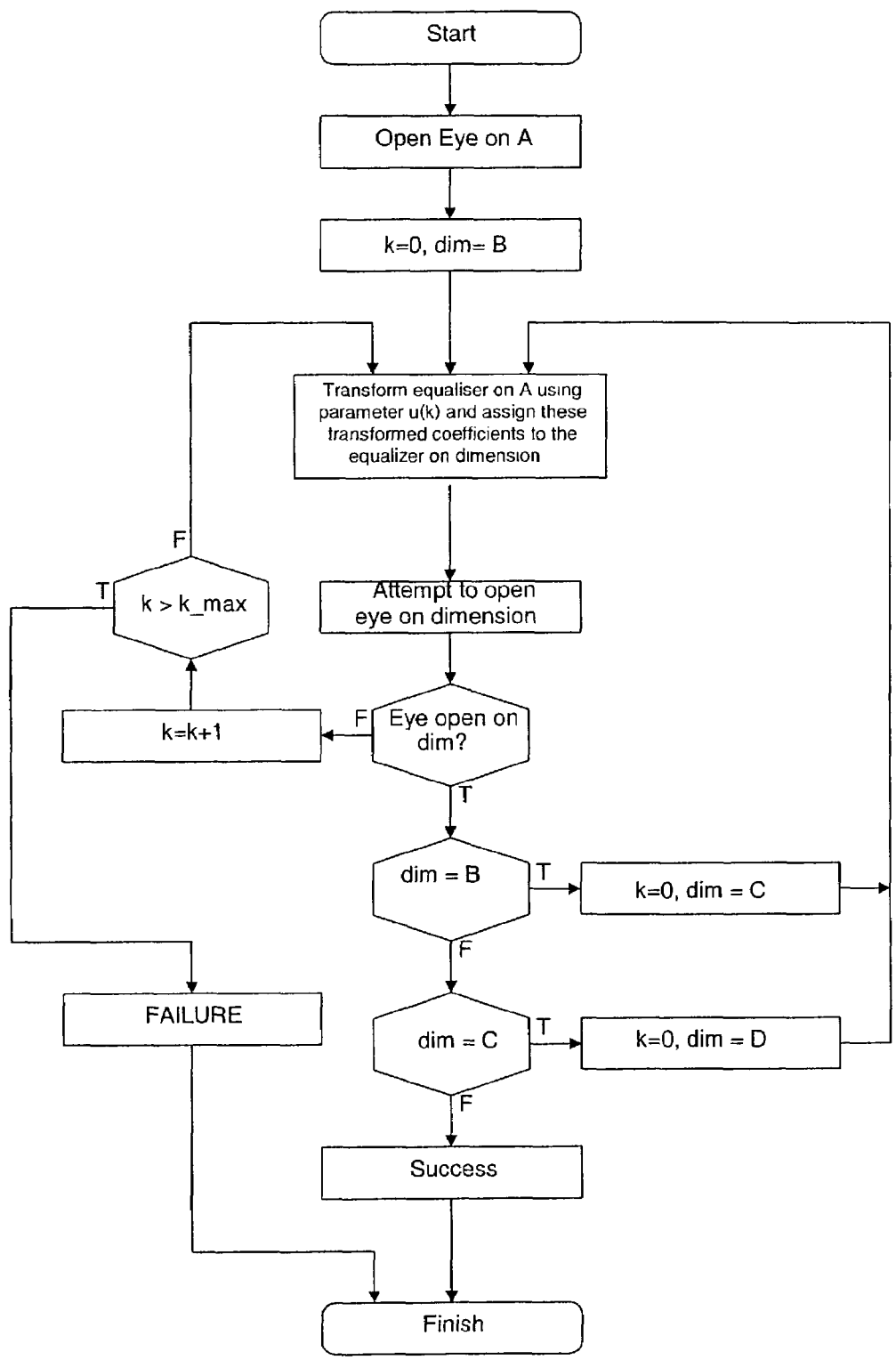
FIG. 1 is a flow diagram illustrating eye opening of four dimensions.

Referring to FIG. 1, in a first step an equalizer of the invention opens the eye for dimension A, and then proceeds to do so for each of the other dimensions using coefficients assigned from A.

In Gigabit Ethernet timing recovery is performed on at least one channel for recovery of the correct sampling phase and sampling frequency. Furthermore in Gigabit Ethernet IID (independently identically distributed) coding is used on channel A, but channels B, C and D use non-IID coding. Channel A is thus a good choice for timing recovery. Thus opening the eye for dimension A is easier than for the dimensions B, C and D as the coding is IID and timing recovery is available.

Referring to the steps in FIG. 1, in a second step the equalizer makes a first attempt at opening the eye for dimension B. An index k of the number of attempts made at opening the eye is maintained. For k=0, the first attempt on each dimension, the equalizer uses the set of coefficients u(0) of A i.e. those used for opening the eye for A, and transformations are performed on this set of coefficients.

Successive attempts are made to open the eye on each channel for k=0 to k=$k_{max}$, using transformed sets of coefficients. When the eye on dimension B is successfully opened that set coefficients is stored for dimension B the process proceeds to k=0 on the dimension C and then to dimension D. When the eye on a dimension B, C or D is successfully opened the error term will converge towards zero. If k>$k_{max}$ and attempts at opening the eye on a dimension have not succeeded a failure is recorded.

The coefficients are transformed in a manner keeping the magnitude response substantially constant, while on the other hand allowing a variety of different phase delays to be applied. Thus, very often a single adaptation algorithm is sufficient to open the eye for each dimension subsequent to the first. An interpolation function is used for the transformation.

Figure 2:
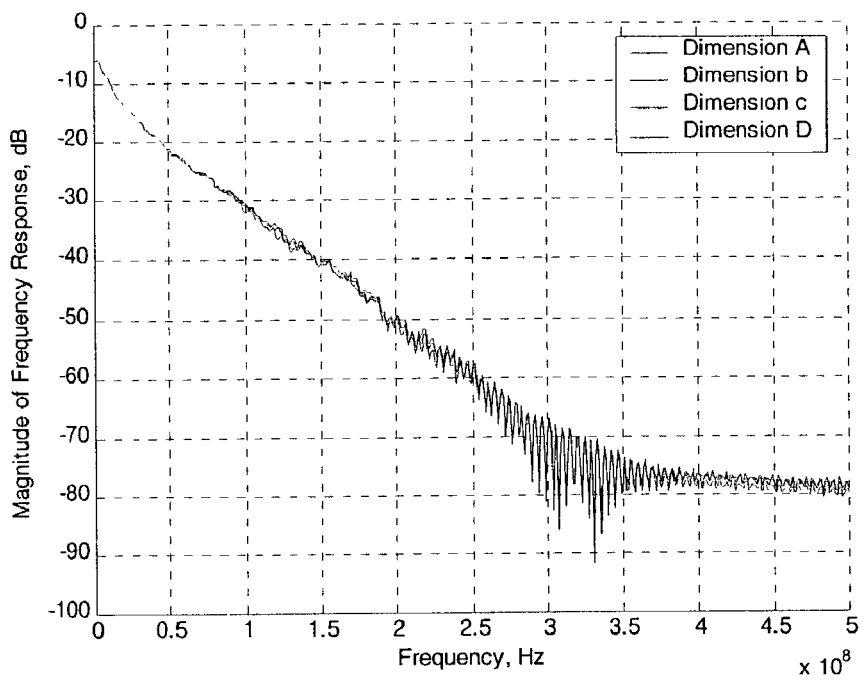
Figure 3:
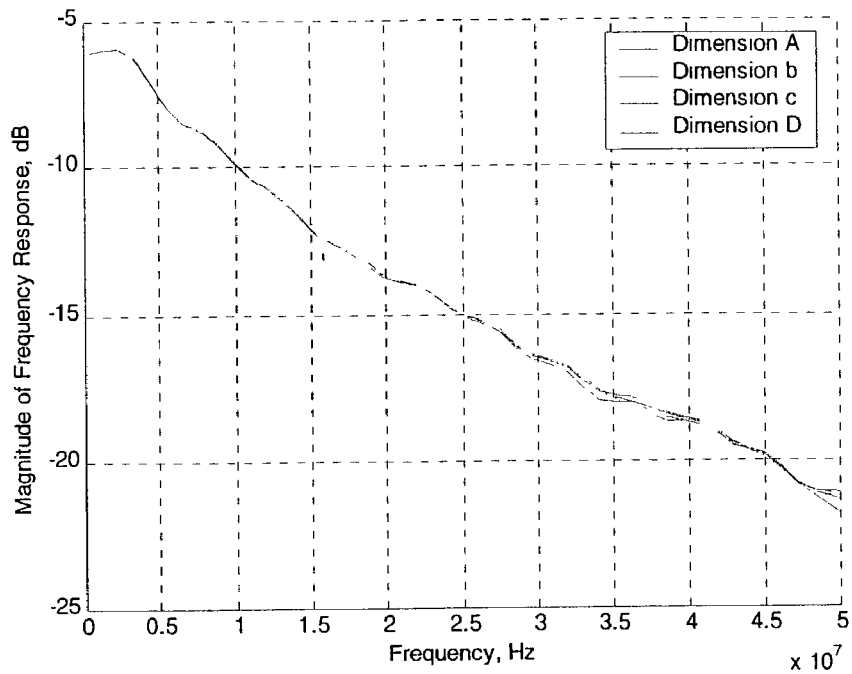
FIG. 3 is a plot zoomed to the 0 Hz to 50 MHz range.

The reasoning for the above is that, as shown in FIGS. 2 and 3 there is close similarity in the magnitude of the frequency responses of the four dimensions because the cables are of approximately the same length. The latter arises from compliance with category UTP-5 status.

The ambiguity in phase comes about because even though the lengths of channel should be very similar, even small differences in length have a large effect on the phase of the signal that is presented to the equalizer input. If all four cables were of identical length then the equalizer coefficients on dimension A would open the eye on the other dimensions. If however one of the channels was to differ in length by a small amount ϵ then the equalizer coefficients from dimension A would compensate for the channel but present a symbol waveform shifted by some fractional amount. This fractional offset is corrected for using the transform function though the equalizer must search through a number of different, not necessarily equally, spaced fractional delays to locate the one that opens the eye. If the eye is open we can use LMS straight away or use a blind algorithm to open the eye further before switching to LMS.

FIG. 2 shows the magnitude of the frequency response of the cables for the 4 different dimensions over the range 0 hz to 500 MHz. Note the similarity across the four dimensions. A zoom of the previous plot concentrating on the 0 hz to 50 MHz range where most of the transmitted signal energy lies is shown in FIG. 3.

The transform function to map coefficients for the equalizer on dimension A into starting points from which to begin adapting from on dimensions B, C and D comes from a family of interpolation functions. As an illustrative example the magnitude response and group delays for transformed versions of the equalizer coefficients are given in FIG. 5 and FIG. 6. In this case a linear interpolator was used, though other interpolation functions are equally valid. The transformation function uses as its source the coefficients of the equalizer on dimension A.

The transform is done in such a way that the group delay through the filter is either lessened by some fractional amount up to a half symbol period or increased by some amount up to a half symbol period. In this way a search is done over an entire symbol period with minimum deviation from the initial position. This minimises the risk of the centre tap of the transformed equalizer from drifting too far to the front or the back of the filter.

Figure 4A:
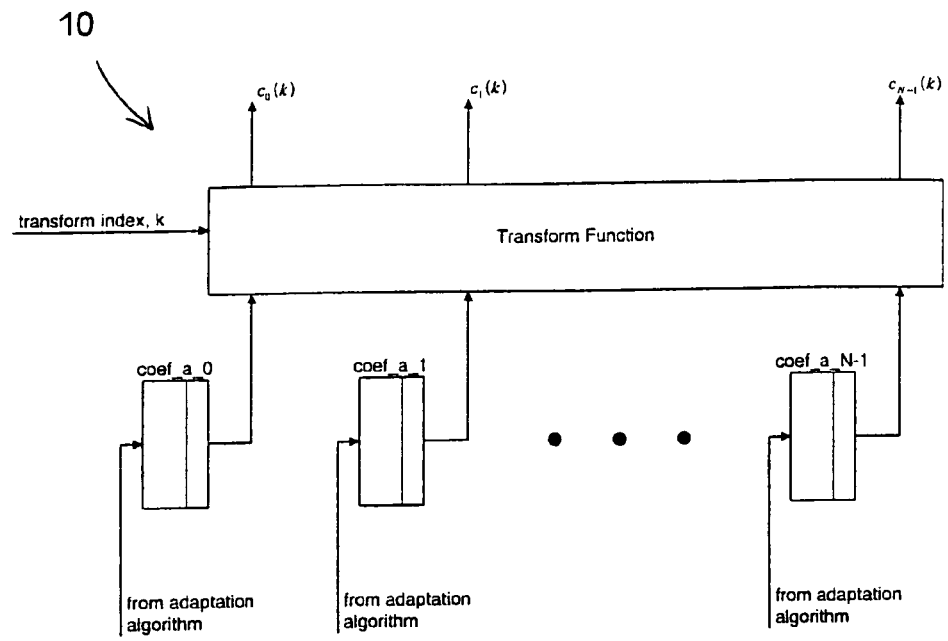
FIGS. 4A and 4B are block diagrams illustrating eye opening equalizer circuits.
Figure 4B:
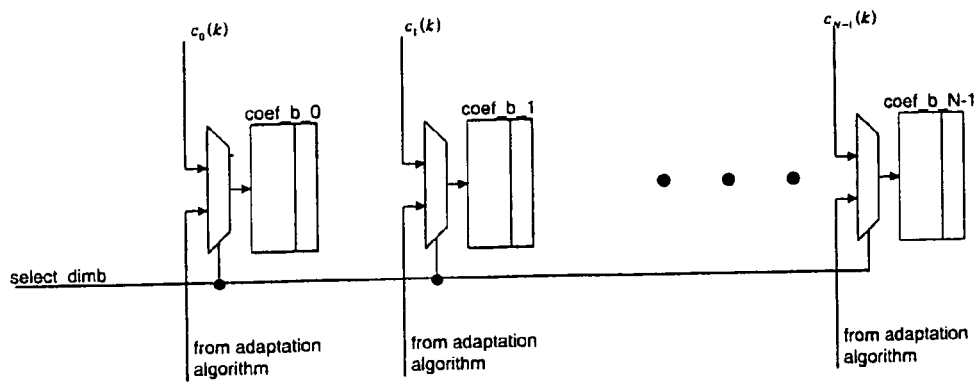

FIGS. 4A and 4B shows an example of an implementation of how a transformed version of coefficients $c_i(k)$ can be generated from the A dimension coefficients $a_i$ and FIG. 4B shows how these coefficients can be loaded as a starting point to the registers for the dimension B (dimb). A comparable structure to that of FIG. 4B would be used for each of the dimensions C and D.

Referring to FIG. 4A, a circuit 10 comprises a series of registers for performing the transformation process. A number of attempts, recorded on an index k, where k=0 to k=$k_{max}$ are made at opening the eye on a particular dimension. For each of the starting points, of the index k=0, the coefficients $a_i$ of the equalizer on dimension A are loaded in sequence into the registers for the dimensions B, C and D. For successive attempts k=1 to $k_{max}$, transformed sets of coefficients $c_i(k)$ are loaded as shown in FIG. 4B. After each new starting point is loaded, the equalizer adapts for a period of time in an attempt to open the eye. During this time the coefficient registers are updated from the adaptation engine.

The error term for each dimension is monitored to determine success and when the error converges to a very small value this indicates that the eye has been opened. The transformation process is performed for each of the channels B, C and D.

TRANSFORM EXAMPLE

One simple transform that yields good results in the 1000BASE-T environment is that of the linear interpolation function. Using the index k the interpolation function can be defined and used as follows:

$$c_i(k) = \begin{cases} a_i & \text{if } \mu(k)=0, \forall\, i \\ \mu(k)a_{i-1} + (1-\mu(k))a_i & \text{if } \mu(k)>0, i \neq 0 \\ (1-\mu(k))a_i + \mu(k)a_{i+1} & \text{if } \mu(k)<0, i \neq N-1 \\ (1-\mu(k))a_i & \text{otherwise} \end{cases}$$

where the $a_i$ are the coefficients of the equalizer on dimension A (as shown in FIG. 4) and $c_i(k)$ are the taps at the output of the transform function assuming the search index has value k. Using a set $a_i$ that corresponds to a typical equalizer for 100 m of UTP-5 cable we can use the linear transform to obtain the family of filters whose characteristics are given in FIGS. 5 and 6.

Figure 5:
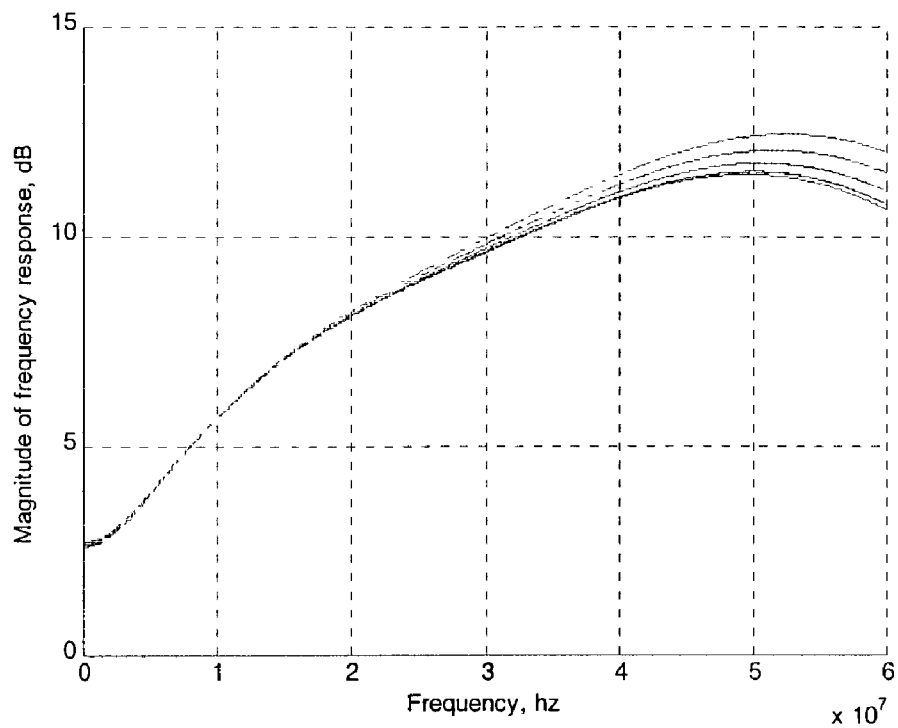
FIG. 5 is a plot of magnitude responses for seven different transforms of the equalizer coefficients on dimension A.
Figure 6:
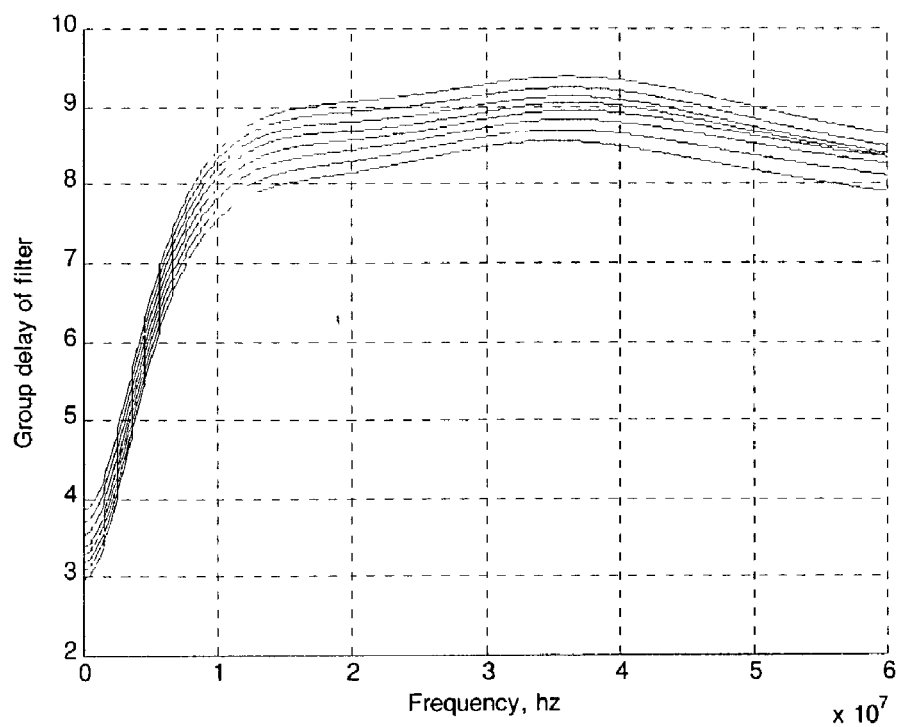
FIG. 6 is a plot of group delays for these transforms.

Referring to FIG. 5, magnitude responses for the equalizer coefficients on dimension A and for 7 different transformations. Referring to FIG. 6, group delays for the equalizer coefficients on dimension A and for 7 different transformations are illustrated.

The invention is particularly advantageous where some of the dimensions are used for non-IID (non independently identically distributed) coding and at least one is used for IID. In general eye opening is much more effective for IID coding, and indeed it is sometimes not possible to obtain convergence for eye opening for non-IID coding. The receiver of the invention can be used to open the eye in an IID dimension and to apply the coefficients of this to the non-IID dimension(s). This transform is applicable because, although the coding is not random in non-IID other factors such as cable length are similar. Thus, the coefficients of the IID dimension are applicable to the non-IID dimension(s).

The invention is not limited to the embodiments described but may be varied in construction and detail.

The invention claimed is:

1. An equalizer for a data communication receiver, the equalizer comprising means for adapting to each of a plurality of channels to open the eye for each channel, said equalizer including means for opening the eye for a first channel, and for applying coefficients adapted from said first channel to open the eye of at least one subsequent channel.

2. An equalizer as claimed in claim 1, wherein the equalizer comprises means for applying the coefficients via a transformation process.

3. An equalizer as claimed in claim 2, wherein the equalizer comprises means for keeping the magnitude response substantially constant during transformation.

4. An equalizer as claimed in claim 2, wherein the equalizer includes compensation means for allowing a plurality of phase delays to be applied during transformation.

5. An equalizer as claimed in claim 2, wherein the equalizer comprises means for performing the transformation according to an interpolation function.

6. An equalizer as claimed in claim 5, wherein the function is a linear interpolation function.

7. An equalizer as claimed in claim 2, wherein the equalizer comprises means for modifying the group delay through a filter during transformation.

8. An equalizer as claimed in claim 7, wherein the group delay is modified by a fraction of a symbol period.

9. An equalizer as claimed in claim 1, wherein the equalizer comprises means for opening the eye of a channel transmitting independently identically distributed (IID) symbols and for applying coefficients adapted from said first channel to open the eye of at least one non-IID channel.

10. A 1000BASE-T transceiver comprising an equalizer as claimed in claim 1.

11. An equalizer for a data communication receiver, the equalizer comprising a circuit for adapting to each of a plurality of channels to open the eye for each channel, said circuit configured to open the eye for a first channel, generating transformed coefficients, and to apply the transformed coefficients to open the eye of at least one subsequent channel.

12. The equalizer as claimed in claim 11, wherein the equalizer is configured to keep the magnitude response substantially constant during transformation.

13. The equalizer as claimed in claim 11, wherein the equalizer is configured to compensate for a plurality of phase delays during transformation.

14. The equalizer as claimed in claim 11, wherein the equalizer is configured to perform the transformation according to an interpolation function.

15. The equalizer as claimed in claim 14, wherein the function is a linear interpolation function.

16. The equalizer as claimed in claim 11, wherein the equalizer is configured to modify the group delay through a filter during transformation.

17. The equalizer as claimed in claim 16, wherein the group delay is modified by a fraction of a symbol period.

18. The equalizer as claimed in claim 11, wherein the equalizer is configured to open the eye of a channel transmitting independently identically distributed (IID) symbols and to apply the transformed coefficients to open the eye of at least one non-IID channel.

19. A 1000BASE-T transceiver comprising an equalizer as claimed in claim 11.

* * * * *